United States Patent
Shin et al.

(10) Patent No.: US 11,029,700 B2
(45) Date of Patent: Jun. 8, 2021

(54) MOBILE ROBOT AND CONTROL METHOD THEREOF

(71) Applicants: LG ELECTRONICS INC., Seoul (KR); SEOUL NATIONAL UNIVERSITY R&DB FOUNDATION, Seoul (KR)

(72) Inventors: Yongmin Shin, Seoul (KR); Donghoon Yi, Seoul (KR); Dongil Cho, Seoul (KR); Taejae Lee, Yongin-si (KR)

(73) Assignees: LG ELECTRONICS INC., Seoul (KR); SEOUL NATIONAL UNIVERSITY R&DB FOUNDATION, Seoul (KR)

(*) Notice: Subject to any disclaimer, the term of this patent is extended or adjusted under 35 U.S.C. 154(b) by 738 days.

(21) Appl. No.: 15/745,679

(22) PCT Filed: Jul. 29, 2016

(86) PCT No.: PCT/KR2016/008335
§ 371 (c)(1),
(2) Date: Jan. 17, 2018

(87) PCT Pub. No.: WO2017/018848
PCT Pub. Date: Feb. 2, 2017

(65) Prior Publication Data
US 2018/0210452 A1    Jul. 26, 2018

(30) Foreign Application Priority Data
Jul. 29, 2015 (KR) .................. 10-2015-0107555

(51) Int. Cl.
*G05D 1/02* (2020.01)
*A47L 9/28* (2006.01)
(Continued)

(52) U.S. Cl.
CPC ............ *G05D 1/0253* (2013.01); *A47L 9/009* (2013.01); *A47L 9/19* (2013.01); *A47L 9/2805* (2013.01);
(Continued)

(58) Field of Classification Search
None
See application file for complete search history.

(56) References Cited

U.S. PATENT DOCUMENTS 9,002,511 B1 * 4/2015 Hickerson ............... G01S 17/86
 700/245
9,053,554 B2 * 6/2015 Uchida ..................... G06T 7/20
(Continued)

FOREIGN PATENT DOCUMENTS

JP  2002-354139   12/2002
WO WO 2004/016400  2/2004

OTHER PUBLICATIONS

IEEE: Robust Inverse Perspective Mapping Based on Vanishing Point by Daiming Zhang, Bin Fang, Weibin Yang, Xiaosong Luo, Yuanyan Tang (Year: 2014).*

(Continued)

*Primary Examiner* — Kevin T Bates
*Assistant Examiner* — Ronak Patel
(74) *Attorney, Agent, or Firm* — Ked & Associates, LLP

(57) ABSTRACT

A cleaner performing autonomous traveling includes a main body having a suction opening, a cleaning unit provided within the main body and sucking a cleaning target through the suction opening, a driving unit moving the main body, a camera sensor attached to the main body and capturing a first image, an operation sensor sensing information related to movement of the main body, and a controller detecting information related to an obstacle on the basis of at least one of the captured image and the information related to move- (Continued)

ment and controlling the driving unit on the basis of the detected information related to the obstacle.

20 Claims, 7 Drawing Sheets

(51) Int. Cl.
    *A47L 9/19*     (2006.01)
    *G06T 7/579*     (2017.01)
    *G06T 7/73*     (2017.01)
    *G06T 7/11*     (2017.01)
    *G06T 7/174*     (2017.01)
    *A47L 9/00*     (2006.01)
    *G05D 1/00*     (2006.01)

(52) U.S. Cl.
    CPC ........... *A47L 9/2842* (2013.01); *A47L 9/2852* (2013.01); *G05D 1/0088* (2013.01); *G05D 1/0221* (2013.01); *G06T 7/11* (2017.01); *G06T 7/174* (2017.01); *G06T 7/579* (2017.01); *G06T 7/74* (2017.01); *A47L 2201/04* (2013.01); *G05D 2201/0215* (2013.01); *G06T 2207/10024* (2013.01); *G06T 2207/20021* (2013.01); *G06T 2207/30261* (2013.01); *Y10S 901/01* (2013.01); *Y10S 901/47* (2013.01)

(56) References Cited

U.S. PATENT DOCUMENTS

| | | | |
|---|---|---|---|
| 2004/0076324 A1 | 4/2004 | Burl et al. | |
| 2006/0088188 A1* | 4/2006 | Ioffe | G06T 7/254 382/103 |
| 2007/0029962 A1 | 2/2007 | Saeki | |
| 2009/0080702 A1* | 3/2009 | Ma | G06T 7/20 382/103 |
| 2010/0134593 A1* | 6/2010 | Kakinami | B60R 1/00 348/43 |
| 2010/0183192 A1* | 7/2010 | Fritsch | G06T 7/254 382/103 |
| 2010/0222925 A1* | 9/2010 | Anezaki | G05D 1/0253 700/253 |
| 2010/0305857 A1* | 12/2010 | Byrne | G06T 7/73 701/301 |
| 2010/0315505 A1* | 12/2010 | Michalke | G06T 7/251 348/118 |
| 2013/0025085 A1* | 1/2013 | Kim | A47L 9/2857 15/319 |
| 2013/0027196 A1* | 1/2013 | Yankun | G06K 9/00805 340/435 |
| 2013/0030750 A1* | 1/2013 | Kim | G06N 3/004 702/108 |
| 2013/0070095 A1* | 3/2013 | Yankun | G06T 7/254 348/148 |
| 2013/0338831 A1 | 12/2013 | Noh et al. | |
| 2014/0124004 A1 | 5/2014 | Rosenstein et al. | |
| 2014/0350839 A1* | 11/2014 | Pack | G05D 1/0214 701/409 |
| 2015/0078619 A1* | 3/2015 | Jiang | G06K 9/00805 382/103 |
| 2016/0144505 A1* | 5/2016 | Fong | B25J 9/1697 700/250 |
| 2016/0147230 A1* | 5/2016 | Munich | G01C 21/206 701/28 |
| 2016/0167226 A1* | 6/2016 | Schnittman | G05D 1/0274 382/153 |
| 2017/0205832 A1* | 7/2017 | Iimura | G05D 1/0253 |

OTHER PUBLICATIONS

IEEE: Stabilization of Inverse Perspective Mapping Images based on Robust Vanishing Point Estimation by Marcos Nieto, Luis Salgado, Fernando Jaureguizar, and Julian' Cabrera (Year: 2007).*
European Search Report dated Mar. 15, 2019 issued in Application No. 16830881.5.
International Search Report and Written Opinion dated Nov. 22, 2016 issued in Application No. PCT/KR2016/008335 (Full English Text).

* cited by examiner

MOBILE ROBOT AND CONTROL METHOD THEREOF

CROSS-REFERENCE TO RELATED PATENT APPLICATIONS

This application is a U.S. National Stage Application under 35 U.S.C. § 371 of PCT Application No. PCT/KR2016/008335, filed Jul. 29, 2016, which claims priority to Korean Patent Application No. 10-2015-0107555, filed Jul. 29, 2015, whose entire disclosures are hereby incorporated by reference.

TECHNICAL FIELD

The present disclosure relates to a robot performing autonomous traveling and a control method thereof, and particularly, to a robot performing a cleaning function during autonomous traveling (i.e., autonomous driving or running) and a control method thereof.

BACKGROUND ART

In general, a robot has been developed for an industrial purpose and has been in charge of part of factory automation. Recently, robot-applied fields have further extended to develop medical robots or aerospace robots, and home robots that may be used in general houses have also been made.

A typical example of home robots is a robot cleaner, which is a sort of a home appliance for performing cleaning by sucking ambient dust or foreign objects, while traveling in a predetermined area. Such a robot cleaner includes a generally rechargeable battery and has an obstacle sensor capable of avoiding an obstacle during traveling so that the robot cleaner may perform cleaning, while traveling.

Recently, beyond performing cleaning while robot cleaners are simply autonomously traveling in a cleaning area, research into utilization of robot cleaners in various fields such as healthcare, smart home, remote control, and the like, has been actively conducted.

DISCLOSURE OF INVENTION

Technical Problem

Therefore, an aspect of the detailed description is to provide a cleaner performing autonomous traveling, capable of detecting information related to an obstacle using a monocular camera or a single camera, and a control method thereof.

Another aspect of the detailed description is to provide a cleaner performing autonomous traveling, capable of detecting an obstacle present on the front side with respect to a main body of a robot using only a single camera, and a control method thereof.

Solution to Problem

To achieve these and other advantages and in accordance with the purpose of this specification, as embodied and broadly described herein, a cleaner includes: a main body having a suction opening; a cleaning unit provided within the main body and sucking a cleaning target through the suction opening; a driving unit moving the main body; a camera sensor attached to the main body and capturing a first image; an operation sensor sensing information related to movement of the main body; and a controller detecting information related to an obstacle on the basis of at least one of the captured image and the information related to movement and controlling the driving unit on the basis of the detected information related to the obstacle.

In an embodiment, the controller may segment the captured first image into a plurality of image regions, and detect first information related to the obstacle from the segmented image regions.

In an embodiment, when a preset time interval has lapsed since the first image was captured, the camera sensor may capture a second image, and the controller may segment the second image into a plurality of image regions, compare the segmented image regions of the first image with the segmented image regions of the second image, and detect first information related to the obstacle on the basis of the comparison result.

In an embodiment, the controller may match the segmented image regions of the second image and the segmented image regions of the first image corresponding to each other, and detects first information related to the obstacle on the basis of a matching result.

In an embodiment, when a preset time interval has lapsed since the first image was captured, the camera sensor may capture a second image and the controller may convert the first image, project the converted image to the second image to generate a third image, and compare the generated third image with the second image to detect second information related to the obstacle.

In an embodiment, the controller may detect the second information related to the obstacle on the basis of a difference in color between the generated third image and the second image.

In an embodiment, the controller may extract at least one feature point from the first image, and detect third information related to the obstacle on the basis of the extracted feature point.

In an embodiment, the controller may set information related to a weight value with respect to each of the first to third information, and detect fourth information related to the obstacle on the basis of the set weight values and the first to third information.

In an embodiment, the controller may generate map information related to the obstacle using the first to third information.

In an embodiment, an image capture angle of the camera sensor may be an omnidirectional range with respect to the main body.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BEST MODE FOR CARRYING OUT THE INVENTION

Hereinafter, embodiments of the present disclosure will be described in detail. The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

The exemplary embodiments of the present invention will now be described with reference to the accompanying drawings, in which like numbers refer to like elements throughout.

Also, in describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Figure 1A:
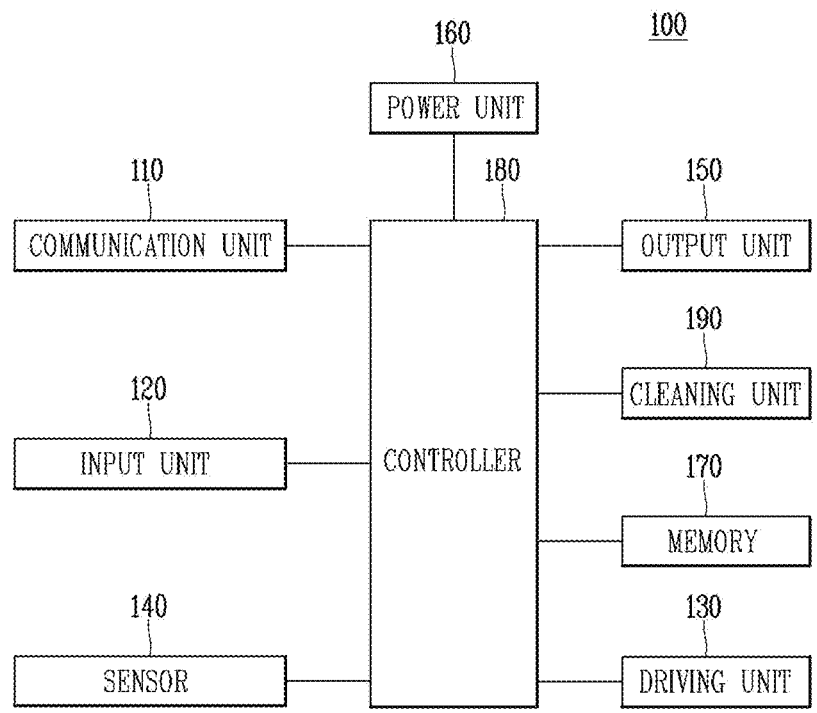
FIG. 1A is a block diagram illustrating components of a mobile robot according to an embodiment of the present disclosure.

FIG. 1A illustrates components of a mobile robot according to an embodiment of the present disclosure.

As illustrated in FIG. 1A, the mobile robot according to an embodiment of the present disclosure may include at least one or any combination of a communication unit 110, an input unit 120, a driving unit 130, a sensor 140, an output unit 150, a power unit 160, a memory 170, a controller 180, and a cleaning unit 190.

Here, the components illustrated in FIG. 1A are not essential and a robot cleaner including fewer or greater components may be implemented. Hereinafter, the components will be described.

First, the power unit 160 includes a battery that can be recharged by an external commercial power source and supplies power to an interior of the mobile robot. The power unit 160 may supply driving power to the components included in the mobile robot to supply operation power required for the mobile robot to drive or perform a specific function.

Here, the controller 180 detects a remaining capacity of the battery and, when remaining battery capacity is insufficient, the controller 180 controls the mobile robot to move to charging station connected to an external commercial power source so as to be supplied with a charge current from the charging station to charge the battery. The battery may be connected to a battery sensing unit and a remaining battery capacity and a charge state may be transferred to the controller 180. The output unit 150 may display the remaining battery capacity on a screen under the control of the controller.

The battery may be positioned in a central lower portion of the robot cleaner or may be positioned on either left or right side of the robot cleaner. In the latter case, the mobile robot may further include a balance weight to resolving bias in weight of the battery.

Meanwhile, the driving unit 130 includes a motor and drives the motor to rotate left and right main wheels of the main body of the mobile robot in both directions to rotate or move the main body. The driving unit 130 may move the main body of the mobile robot forwards/backwards and leftwards/rightwards, move in a curved manner, or may rotate in place.

Meanwhile, the input unit 120 receives various control commands regarding the robot cleaner from a user. The input unit 120 may include one or more buttons, for example, an OK button, a setting button, and the like. The OK button is a button for receiving a command for checking detection information, obstacle information, position information, and map information from the user, and the setting button may be a button for receiving a command for setting the aforementioned types of information from the user.

Also, the input unit 120 may include an input resetting button for canceling a previous user input and receiving a user input again, a delete button for deleting a preset user input, a button for setting or changing an operation mode, or a button for receiving a command for returning to the charging station.

Also, the input unit 120 may be installed in an upper portion of the mobile robot, as a hard key, a soft key, or a touch pad. Also, the input unit 120 may have a form of a touch screen together with the output unit 150.

Meanwhile, the output unit 150 may be installed in an upper portion of the mobile robot. An installation position or an installation form thereof may be varied. For example, the output unit 150 may display a battery state or a traveling scheme.

Also, the output unit may output information regarding a state of an interior of the mobile robot detected by the sensor 140, for example, a current state of each component included in the mobile robot. Also, the output unit 150 may display external state information, obstacle information, position information, and map information detected by the sensor 140 on a screen. The output unit 150 may be configured as at least one device among a light emitting diode (LED), a liquid crystal display (LCD), a plasma display panel (PDP), an organic light emitting diode (OLED).

The output unit 150 may further include a sound output unit audibly outputting an operational process or an operation result of the mobile robot performed by the controller 180. For example, the output unit 150 may output a warning sound outwardly according to a warning signal generated by the controller 180.

Here, the sound output unit may be a unit for outputting a sound, such as a beeper, a speaker, and the like, and the output unit 150 may output audio data or message data having a predetermined pattern stored in the memory 170 through the sound output unit.

Thus, the mobile robot according to an embodiment of the present disclosure may output environment information regarding a traveling region on a screen or output it as a sound through the output unit 150. Also, according to another embodiment, the mobile robot may transmit map information or environment information to a terminal device through the communication unit 110 such that the terminal device may output a screen or a sound to be output through the output unit 150.

Meanwhile, the communication unit 110 may be connected to the terminal device and/or a different device positioned within a specific region (which will be used together with a "home appliance" in this disclosure) according to one communication scheme among wired, wireless, and satellite communication schemes to transmit and receive data.

The communication unit 110 may transmit and receive data to and from a different device positioned within a specific region. Here, the different device may be any device as long as it can be connected to a network and transmit and receive data. For example, the different device may be a device such as an air-conditioner, a heating device, an air purifier, a lamp, a TV, an automobile, and the like. Also, the different device may be a sensor sensing a temperature, humidity, atmospheric pressure, a gas, and the like.

Thus, the controller 180 may transmit a control signal to the different device through the communication unit 110, and thus, the different device may operate according to the received control signal. For example, in a case in which the different device is an air-conditioner, the different device may perform cooling or heating on a specific region when a power is turned on or according to a control signal. In a case in which the different device is a device for controlling a window, the different device may open or close a window or may open the window in a predetermined ratio.

Also, the communication unit 110 may receive various types of state information from at least one different devices positioned within a specific region. For example, the communication unit 110 may receive a set temperature of an air-conditioner, opening and closing information indicating whether a window is opened or closed or a degree of opening or closing a window, a current temperature of a specific region sensed by a temperature sensor.

Accordingly, the controller 180 may generate a control signal with respect to the different device according to the state information, a user input through the input unit 120, or a user input through the terminal device.

Here, the communication unit 110 may employ at least one of wireless communication schemes such as radio frequency (RF) communication, Bluetooth, IrDA, wireless local area network (WLAN), ZigBee, and the like, and accordingly, the different device and the mobile robot 100 may establish at least one network. Here, the network may be the Internet.

The communication unit 110 may receive a control signal from the terminal device. Thus, the controller 180 may perform a control command related to various operations according to the control signal received through the communication unit 110. For example, a control command that may be received from the user through the input unit 120 may be received from the terminal device through the communication unit 110, and the controller 180 may perform the received control command. Also, the communication unit 110 may transmit state information of the mobile robot, obstacle information, position information, image information, map information, and the like, to the terminal device. For example, the controller 180 may transmit various types of information that can be output through the output unit 150, to the terminal device through the communication unit 110.

Here, the communication unit 110 may employ at least one communication scheme among wireless communication schemes such as RF communication, Bluetooth, IrDA, WLAN, ZigBee, and the like, to communicate with the terminal device such as a computer such as a laptop computer, a display device, and a mobile terminal (e.g., a smartphone).

Accordingly, the different device and the mobile robot 100 may establish at least one network. Here, the network may be the Internet. For example, in a case in which the terminal device is a mobile terminal, the robot cleaner 100 may communicate with the terminal device through the communication unit 110 using a communication scheme employed by the mobile terminal.

Meanwhile, the memory 170 stores a control program controlling or driving the robot cleaner and data corresponding thereto. The memory 170 may store audio information, image information, obstacle information, position information, map information, and the like. Also, the memory 170 may store information related to a traveling pattern.

As the memory 170, a non-volatile memory is commonly used. Here, the non-volatile memory (NVM) (or NVRAM) is a storage device capable of continuously maintaining stored information even though power is not applied thereto. For example, the memory 170 may be a ROM, a flash memory, a magnetic computer storage device (for example, a hard disk or a magnetic tape), an optical disk drive, a magnetic RAM, a PRAM, and the like.

Meanwhile, the sensor 140 may include at least one of an external signal sensor, a front sensor, and a cliff sensor.

The external signal sensor may sense an external signal of the mobile robot. The external signal sensor may be, for example, an infrared sensor, an ultrasonic sensor, an RF sensor, and the like.

The mobile robot may check a position and a direction of the charging station upon receiving a guide signal generated by the charging station using the external signal sensor. Here, the charging station may transmit the guide signal indicating a direction and a distance such that the mobile robot may be returned. That is, upon receiving the signal transmitted from the charging station, the mobile robot may determine a current position and set a movement direction to return to the charging state.

Also, the mobile robot may detect a signal generated by a remote control device such as a remote controller, a terminal, and the like, using the external signal sensor.

The external signal sensor may be provided on one side within or outside of the mobile robot. For example, the infrared sensor may be installed within the mobile robot or in a vicinity of a camera sensor.

Meanwhile, the front sensor may be installed at a predetermined interval on a front side of the mobile robot, specifically, along an outer circumferential surface of a side surface of the mobile robot. The front sensor may be positioned on at least one side surface of the mobile robot to sense an obstacle ahead. The front sensor may sense an object, in particular, an obstacle, present in a movement direction of the mobile robot and transfer detection information to the controller 180. That is, the front sensor may sense a protrusion present in a movement path of the mobile robot, furnishings, furniture, a wall surface, a wall corner, and the like, in a house, and transmit corresponding information to the controller 180.

The front sensor may be, for example, an infrared sensor, an ultrasonic sensor, an RF sensor, a geomagnetic sensor, and the like, and the mobile robot may use a type of sensor or two or more types of sensors together as the front sensor.

For example, in general, the ultrasonic sensor may be mainly used to sense an obstacle in a remote area. The ultrasonic sensor may include a transmission unit and a reception unit. The controller 180 may determine whether an obstacle is present according to whether an ultrasonic wave radiated through the transmission unit is reflected by an obstacle, or the like, and received by the reception unit, and calculate a distance to the obstacle by using an ultrasonic wave radiation time and an ultrasonic wave reception time.

Also, the controller 180 may detect information related to a size of an obstacle by comparing an ultrasonic wave radiated from the transmission unit and an ultrasonic wave received by the reception unit. For example, as a larger amount of ultrasonic waves is received by the reception unit, the controller 180 may determine that the size of the obstacle is larger.

In an embodiment, a plurality of ultrasonic sensors (for example, five ultrasonic sensors) may be installed on an outer circumferential surface of a front side of the mobile robot. Here, preferably, the transmission units and the reception units of the ultrasonic sensors may be installed alternately on the front side of the mobile robot.

Namely, the transmission units may be disposed to be spaced apart from the center of the front side of the main body of the mobile robot, and in this case, one or two or more transmission units may be disposed between reception units to form a reception region of an ultrasonic signal reflected from the obstacle, or the like. Due to this disposition, a reception region may be expanded, while reducing the number of sensors. A transmission angle of ultrasonic waves may be maintained at an angle of a range which does not affect other signals to prevent a crosstalk phenomenon. Also, reception sensitivity of the reception units may be set to be different.

Also, the ultrasonic sensors may be installed upwardly at a predetermined angle such that ultrasonic waves generated by the ultrasonic sensors are output upwardly, and in this case, in order to prevent the ultrasonic waves from being radiated downwardly, a predetermined blocking member may be further provided.

Meanwhile, as mentioned above, two or more types of sensors may be used as the front sensors, and thus, one or more types of sensor among an infrared sensor, an ultrasonic sensor, and an RF sensor may be used as the front sensors.

For example, the front sensor may include an infrared sensor as a different type of sensor, in addition to the ultrasonic sensor.

The infrared sensor may be installed on an outer circumferential surface of the mobile robot together with the ultrasonic sensor. The infrared sensor may also sense an obstacle present in front of or by the side of the mobile robot and transmit corresponding obstacle information to the controller 180. That is, the infrared sensor may sense a protrusion present in a movement path of the mobile robot, furnishings, furniture, a wall surface, a wall corner, and the like, in a house, and transmit corresponding information to the controller 180. Thus, the mobile robot may move within a cleaning area without colliding with an obstacle.

Meanwhile, as the cliff sensor, various types of optical sensors may be use, and the cliff sensor may sense an obstacle of the floor supporting the main body of the mobile robot.

That is, the cliff sensor may be installed on a rear surface of the mobile robot 100 and may be installed in different regions depending on a type of a mobile robot. The cliff sensor may be positioned on a rear surface of the mobile robot to sense an obstacle on the floor. The cliff sensor may be an infrared sensor including a light emitting unit and a light receiving unit, an ultrasonic sensor, an RF signal, a position sensitive detector (PSD) sensor, and the like, like the obstacle sensor.

For example, any one of cliff sensors may be installed on the front side of the mobile robot, and the other two cliff sensors may be installed on a relatively rear side.

For example, the cliff sensor may be a PSD sensor or may include a plurality of different types of sensor.

The PSD sensor detects the positions of the short and long distances of an incident light with a single p-n junction by using the surface resistance of a semiconductor. The PSD sensor includes a 1D PSD sensor that detects light on a single axis and a 2D PSD sensor that may detect the position of light on the surface, and they have a pin photodiode structure. The PSD sensor is a type of infrared sensor which transmits an infrared ray to an obstacle and measures an angle between the infrared ray transmitted to the obstacle an infrared ray returned after being reflected from the obstacle, thus measuring a distance therebetween. That is, the PSD sensor calculates a distance to the obstacle using triangulation.

The PSD sensor includes a light emitting unit emitting infrared light to an obstacle and a light receiving unit receiving infrared light returned after being reflected from the obstacle. In general, the PSD sensor is formed as a module. In a case in which an obstacle is sensed by using the PSD sensor, a stable measurement value can be obtained regardless of difference in reflectivity or color of the obstacle.

The controller 180 may measure an angle between an infrared light emitting signal irradiated by the cliff sensor toward the floor and a reflection signal received after being reflected from the obstacle to sense a cliff, and analyze a depth thereof.

Meanwhile, the controller 180 may determine whether the mobile robot may be able to pass through a cliff according to a floor state of the cliff sensed by using the cliff sensor. For example, the controller 180 may determine whether a cliff is present and a depth of the cliff through the cliff sensor and only when a reflection signal is sensed by the cliff sensor, the controller 180 allows the mobile robot to pass through the cliff.

In another example, the controller 180 may determine whether the mobile robot is lifted using the cliff sensor.

Figure 1B:
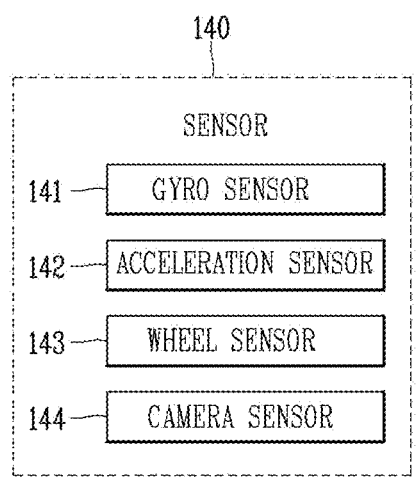
FIG. 1B is a block diagram illustrating specific components included in a sensor of a mobile robot according to an embodiment of the present disclosure.

Referring to FIG. 1B, the sensor 140 may include at least one of a gyro sensor 141, an acceleration sensor 142, a wheel sensor 143, and a camera sensor 144.

The gyro sensor 141 senses a rotational direction and detects a rotation angle when the mobile robot moves. In detail, the gyro sensor 141 may detect an angular velocity of the mobile robot and output a voltage or current value in proportion to the angular velocity, and the controller 180 may sense a rotational direction and a rotation angle using the voltage or current value output from the gyro sensor.

The acceleration sensor 142 senses a change in speed of the mobile robot, for example, a change in a movement speed due to start, stop, a change in direction, collision with an object, and the like. The acceleration sensor 142 may be attached to a position adjacent to the main wheel or an auxiliary wheel to detect sliding or idle rotation of the wheel. The acceleration sensor 142 may be installed in an operation sensing unit to sense a change in speed of the mobile robot. That is, the acceleration sensor 142 may detect impulse according to a change in speed, and output a voltage or current value corresponding thereto. Thus, the acceleration sensor 142 may serve as an electronic bumper.

The wheel sensor 143 may be connected to main wheels and sense an RPM of the main wheels. Here, the wheel sensor 143 may be an encoder. The encoder may sense an RPM of each of left and/or right main wheels and outputs the same. The operation sensing unit may calculate a rotation speed of the left and right wheels using the RPMs, and may calculate a rotation angle of the mobile cleaner using a difference in RPM between the left and right wheels.

Meanwhile, the camera sensor 144 may be provided on a rear surface of the mobile robot and obtain image information regarding a lower side, namely, the floor (or a surface to be cleaned) during movement. The camera sensor provided on the rear surface may be defined as a lower camera sensor and may also be called an optical flow sensor.

The lower camera sensor may convert an image of the lower side input from an image sensor provided therein to generate a predetermined format of image data. The generated image data may be stored in the memory 170.

The lower camera sensor may further include a lens (not shown) and a lens adjusting unit (not shown) for adjusting the lens (not shown). As the lens, a pan focus type lens having a short focal length and a deep depth is preferably used. The lens adjusting unit may include a predetermined motor and a moving unit to move the lens forwardly and backwardly and adjusts a position of the lens by using the motor and the moving unit.

Also, one or more light sources may be installed to be adjacent to an image sensor. One or more light sources irradiate light to a predetermined region of the floor captured by the image sensor. Namely, in a case in which the mobile robot moves a cleaning region along the floor, when the floor is smooth, a predetermined distance is maintained between the image sensor and the floor. On the other hand, in a case in which the mobile robot moves on the floor which is uneven, the image sensor may become away from the floor by a predetermined distance or greater due to depressions and protrusions and an obstacle of the floor. In this case, the one or more light sources may be controlled by the controller 180 such that an amount of irradiated light can be adjusted. The light sources may be a light emitting device, for example, a light emitting diode (LED), or the like, whose amount of light can be adjusted.

The controller 180 may detect a position of the mobile robot regardless of whether the mobile robot slides by using the lower camera sensor. The controller 180 may compare and analyze image data captured by the lower camera sensor over time to calculate a movement distance and a movement direction, and calculate a position of the mobile robot on the basis of the calculated movement distance and the movement direction. By using the image information regarding the lower side of the mobile robot using the lower camera sensor, the controller 180 may perform correction resistant to sliding with respect to a position of the mobile robot calculated by other means.

Meanwhile, the camera sensor may be installed to face an upper side or a front side of the mobile robot to capture images around the mobile robot. The camera sensor installed to face the upper side or the front side may be defined as an upper camera sensor. When the mobile robot includes a plurality of camera sensors, the camera sensors may be formed in an upper portion or on a side surface of the mobile robot at a predetermined distance or at a predetermined angle.

The upper camera sensor may include a lens for adjusting a focal point of a subject, an adjusting unit for adjusting the camera sensor, and a lens adjusting unit for adjusting the lens. As the lens, a lens having a wide angle of view may be used such that every surrounding region, for example, the entire region of the ceiling, may be imaged even in a predetermined position. For example, a lens having an angle equal to or greater than a predetermined angle of view, for example, equal to or greater than 160 degrees, may be used.

The controller 180 may recognize a position of the mobile robot using image data captured by the upper camera sensor, and create map information regarding a specific region. The controller 180 may precisely recognize a position by using image data obtained by the acceleration sensor, the gyro sensor, the wheel sensor, and the lower camera sensor and the image data obtained by the upper camera sensor.

Also, the controller 180 may generate map information by using the obstacle information detected by the front sensor, the obstacle sensor, and the like, and the position recognized by the upper camera sensor. Alternatively, the map information may be received from the outside and stored in the storage unit 170, rather than being created by the controller 180.

In an embodiment, the upper camera sensor may be installed to face a front side of the mobile robot. Also, an installation direction of the upper camera sensor may be fixed or may be changed by the controller 180.

The cleaning unit 190 includes an agitator rotatably installed in a lower portion of a main body of the mobile robot, and a side brush rotating about a rotational shaft of the main body of the mobile robot in a vertical direction to clean the corner, a nook, and the like, of a cleaning region such as a wall surface, or the like.

The agitator rotates about an axis of the main body of the mobile robot in a horizontal direction, to make dust of the floor, the carpet, and the like, float in the air. A plurality of blades are provided in a spiral direction on an outer circumferential surface of the agitator. A brush may be provided between the spiral blades. Since the agitator and the side brush rotate about different axes, the mobile robot generally needs to have a motor for driving the agitator and a motor for driving the side brush.

The side brush is disposed on both sides of the agitator and an motor unit is provided between the agitator and the side brush to transmit rotary power of the agitator to the side brush, such that both the agitator and the side brush may be driven by using a single brush motor. In this case, as the motor unit, a worm and a worm gear may be used, or a belt may be used.

The cleaning unit 190 may include a dust container storing collected dust, a sucking fan providing power to suck dust in a cleaning region, and a sucking motor rotating the sucking fan to suck air, thereby sucking dust or foreign objects.

The sucking fan includes a plurality of blades for making air flow, and a member formed to have an annular shape on an outer edge of an upper stream of the plurality of blades to connect the plurality of blades, and guiding air introduced in a direction of a central axis of the sucking fan to flow in a direction perpendicular to the central axis.

Here, the cleaning unit 190 may further include a filter having a substantially rectangular shape and filtering out filth or dust in the air.

The filter may include a first filter and a second filter as needed, and a bypass filter may be formed in a body forming the filter. The first filter and the second filter may be a mesh filter or a high efficiency particulate arresting (HEPA) filter. The first filter and the second filter may be formed of different non-woven cloth or a paper filter, or both the non-woven cloth and the paper filter may be used together.

The controller 180 may detect a state of the dust container. In detail, the controller 180 may detect an amount of dust collected in the dust container and detect whether the dust container is installed in the mobile robot or whether the dust container has been separated from the mobile robot. In this case, the controller may sense a degree to which dust is collected in the dust container by inserting a piezoelectric sensor, or the like, into the dust container. Also, an installation state of the dust container may be sensed in various manners. For example, as a sensor for sensing whether the dust container is installed, a microswitch installed to be turned on and off on a lower surface of a recess in which the dust container is installed, a magnetic sensor using a magnetic field of a magnet, an optical sensor including a light emitting unit and a light receiving unit, and receiving light, and the like, may be used. The magnetic sensor may include a sealing member formed of a synthetic rubber material in portion where magnet is bonded.

Also, the cleaning unit 190 may further include a rag plate detachably attached to a lower portion of the main body of the mobile robot. The rag plate may include a detachably attached rag, and the user may separate the rag to wash or replace it. The rag may be installed in the rag plate in various manners, and may be attached to the rag plate by using a patch called Velcro. For example, the rag plate is installed in the main body of the mobile robot by magnetism. The rag plate includes a first magnet and the main body of the cleaner may include a metal member or a second magnet corresponding to the first magnet. When the rag plate is normally positioned on the bottom of the main body of the mobile robot, the rag plate is fixed to the main body of the mobile robot by the first magnet and a metal member or the first magnet and the second magnet.

The mobile robot may further include a sensor sensing whether the rag plate is installed. For example, the sensor may be a reed switch operated by magnetism, or may be a hall sensor. For example, the reed switch may be provided in the main body of the mobile robot, and when the rag plate is coupled to the main body of the mobile robot, the reed switch may operate to output an installation signal to the controller 180.

Hereinafter, an embodiment related to an external appearance of the mobile robot according to an embodiment of the present disclosure will be described with reference to FIG. 2.

Figure 2:
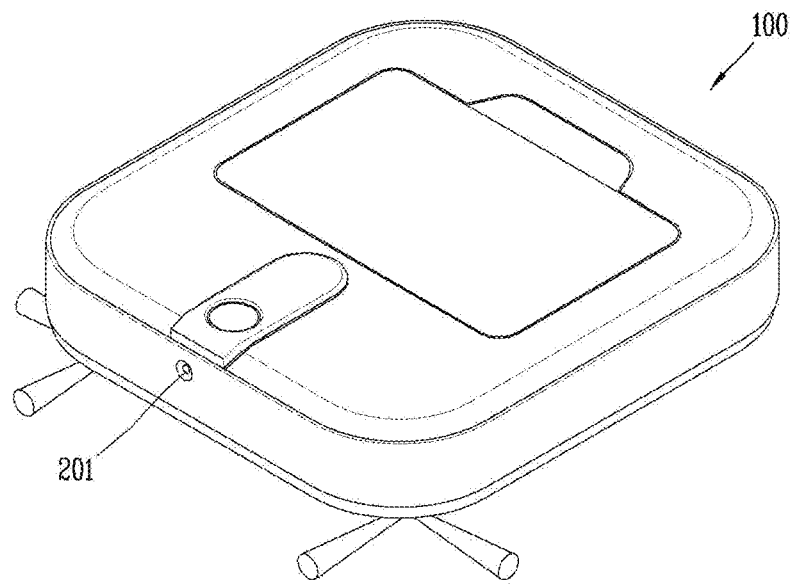
FIG. 2 is a conceptual view illustrating an appearance of a mobile robot according to an embodiment of the present disclosure.

Referring to FIG. 2, the mobile robot 100 may include a single camera 201. The single camera 201 may correspond to the camera sensor 144. Also, an image capture angle of the camera sensor 144 may be an omnidirectional range.

Meanwhile, although not shown in FIG. 2, the mobile robot 100 may include a lighting unit together with the camera sensor 144. The lighting unit may irradiate light in a direction in which the camera sensor 144 is oriented.

In addition, hereinafter, the mobile robot 100 and "a cleaner performing autonomous traveling" are defined as having the same concept.

Figure 3:
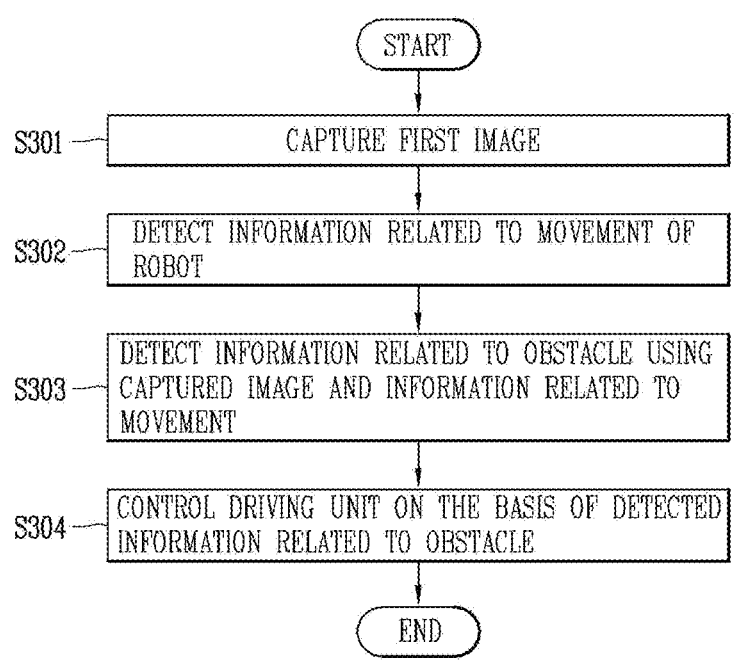
FIG. 3 is a flow chart illustrating a method for controlling a mobile robot according to an embodiment of the present disclosure.

Hereinafter, a control method of the mobile robot 100 according to an embodiment of the present disclosure will be described with reference to FIG. 3.

The camera sensor 144 may capture a first image (S301).

As illustrated in FIG. 2, the camera sensor 144 may be a monocular camera fixedly installed in the main body of the mobile robot 100. That is, the camera sensor 144 may capture the first image in a direction fixed with respect to a movement direction of the main body.

Also, the operation sensor 141, 142, or 143 may sense movement of the mobile robot or information related to movement of the main body of the mobile robot (S302).

The operation sensor may include at least one of the gyro sensor 141, the acceleration sensor 142, and the wheel sensor 143.

The controller 180 may detect information related to an obstacle on the basis of at least one of the first captured image and information related to the sensed movement (S303).

In detail, the controller 180 may detect the information related to the obstacle by extracting feature points regarding the first image, segmenting the first image, or projecting the first image to a different image. In this manner, in order to detect information related to the obstacle from the first image, the controller 180 may make various analyses and finally detect information related to the obstacle by applying different weight values to the analysis results.

The controller 180 may control the driving unit 130 on the basis of the detected information related to the obstacle (S304).

In detail, the controller 180 may generate map information related to the obstacle by using the detected information related to the obstacle or update previously stored map information. In addition, the controller 180 may control the driving unit 130 to avoid collision of the mobile robot 100 with respect to the obstacle on the basis of the map information. In this case, the controller 180 may use a preset avoidance operation algorithm or may control the driving unit 130 to maintain a distance between the obstacle and the mobile robot 100 at a predetermined interval or greater.

Hereinafter, various embodiments in which the mobile robot 100 or the cleaner performing autonomous traveling detect information related to an obstacle from an image captured by the camera sensor 144 will be described.

In an embodiment, the controller 180 may detect first information related to an obstacle by segmenting an image captured by the camera sensor 144.

The controller 180 may segment the captured first image into a plurality of image regions. In addition, the controller 180 may detect first information related to an obstacle from the segmented image regions. For example, the controller 180 may set information related to a plurality of image regions included in the first image by using a super-pixel algorithm with respect to the first image.

Figure 4:
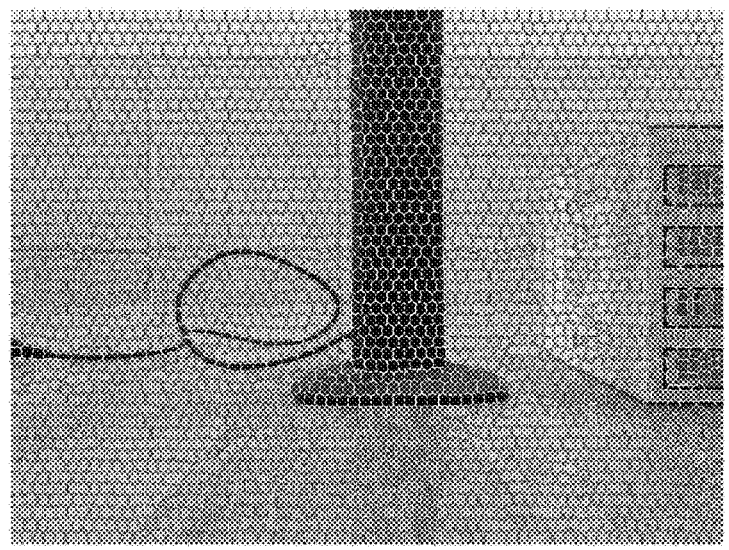
FIG. 4 is a conceptual view illustrating an embodiment in which a mobile robot according to the present disclosure segments a captured image to detect an obstacle.

FIG. 4 illustrates an embodiment in which information related to a plurality of image regions is set by segmenting the first image.

Also, when a preset time interval has lapsed since the first image was captured, the camera sensor 144 may capture a second image. That is, the camera sensor 144 may capture the first image at a first time point and capture a second image at a second time point after the first time point.

The controller 180 may segment the second image into a plurality of image regions. In addition, the controller 180 may compare the segmented image regions of the first image and the segmented image regions of the second image. The controller 180 may detect the first information related to an obstacle on the basis of the comparison result.

The controller 180 may match corresponding regions of the segmented image regions of the second image to the segmented image regions of the first image. That is, the controller 180 may compare the plurality of image regions included in the first image captured at the first time point and the plurality of image regions included in the second image captured at the second time point, and match the plurality of image regions included in the second image to corresponding regions of the plurality of image regions included in the first image.

Accordingly, the controller 180 may detect the first information related to an obstacle on the basis of the matching result.

Meanwhile, when traveling of the mobile robot 100 performed after the first point in time at which the first image was captured satisfies specific conditions, the camera sensor 144 may capture the second image. For example, the specific conditions may include conditions related to at least one of a traveling time, a traveling distance, and a traveling direction.

Hereinafter, an embodiment in which the mobile robot according to the present disclosure detects an obstacle using a plurality of captured images will be described with reference to FIGS. 5A to 5E.

Figure 5A:
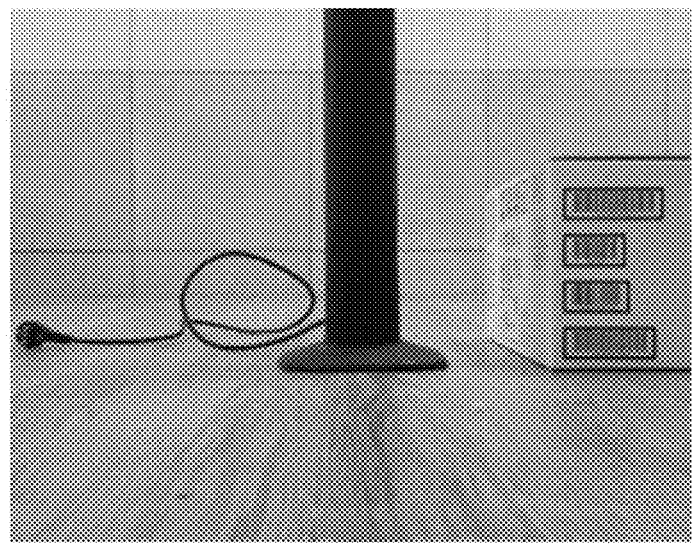
FIGS. 5A to 5F are conceptual views illustrating an embodiment in which a mobile robot according to the present disclosure detects an obstacle using a captured image.
Figure 5B:
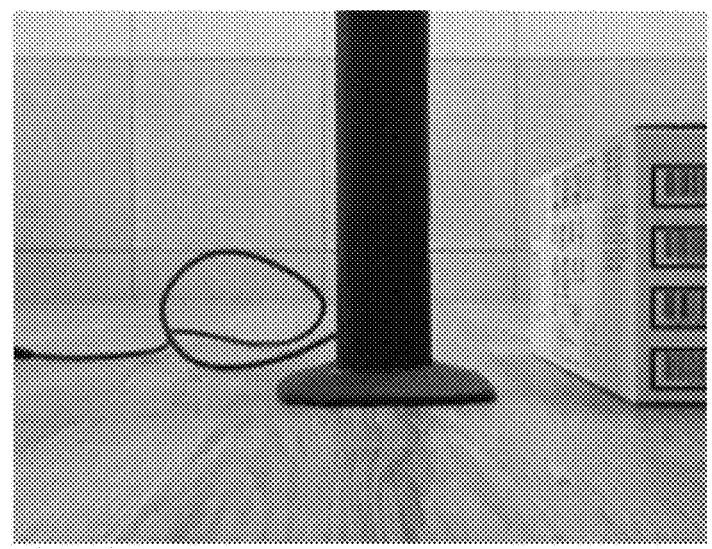

FIG. 5A illustrates a first image, and FIG. 5B illustrates a second image. As discussed above, the first image may be captured by the camera sensor 144 at the first time point and the second image may be captured by the camera sensor 144 at the second time point.

Figure 5C:
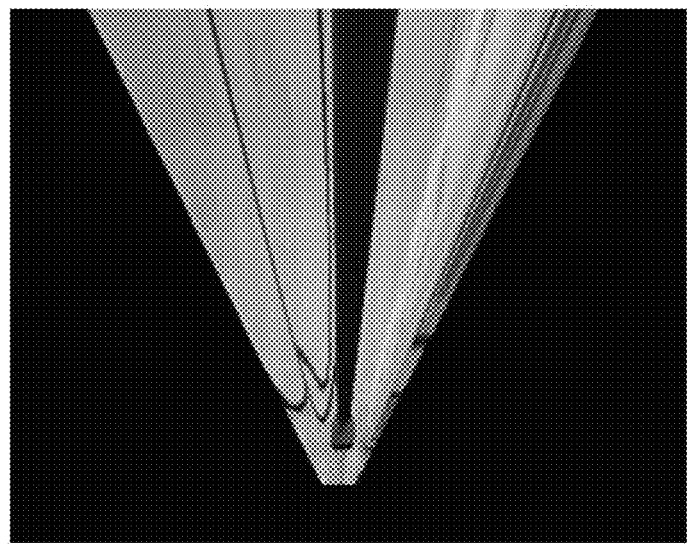

The controller 180 may convert the first image on the basis of information related to a floor in contact with the driving unit 130—of the mobile robot 100. In this case, the information related to the floor may be set in advance by the user. Referring to FIG. 5C, the converted first image is illustrated. That is, the controller 180 may convert the first image by performing inverse perspective mapping on the first image.

For example, the controller 180 may project the first image with respect to a reference image related to the floor corresponding to the first image. In this case, the controller 180 may convert the first image on the assumption that there is no obstacle on the floor corresponding to the first image.

In addition, the controller 180 may generate a third image by projecting the converted image to the second image.

Figure 5D:
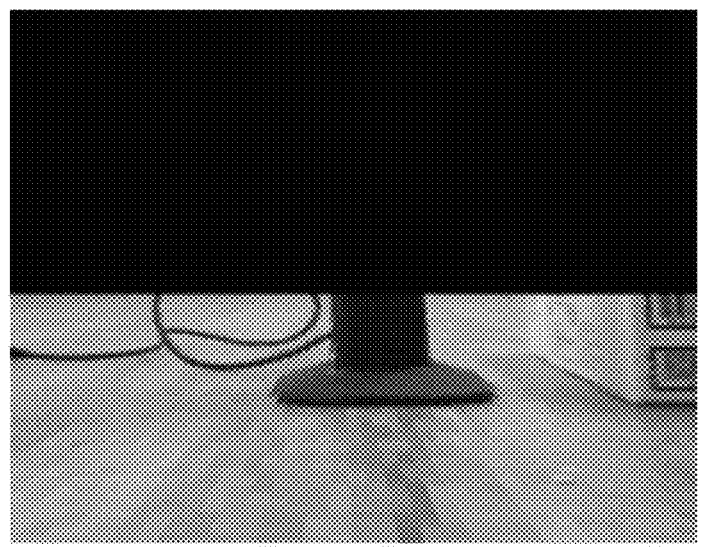

In detail, the controller 180 may back-project the converted first image to the second image. Referring to FIG. 5D, the converted first image may be back-projected to the second image to generate the third image.

Also, the controller 180 may detect second information related to an obstacle by comparing the generated third image with the second image. The controller 180 may detect the second information related to an obstacle on the basis of a difference in color between the generated third image and the second image.

Figure 5E:
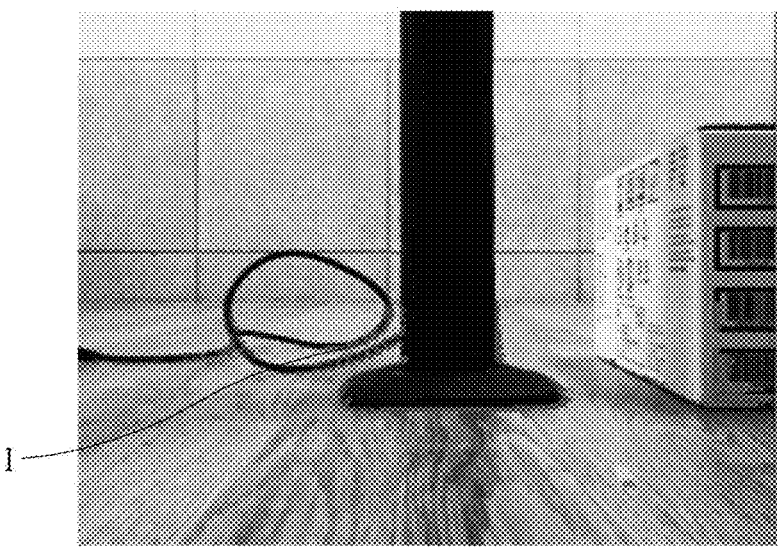

FIG. 5E illustrates an embodiment in which the detected second information (I) is displayed on the second image. In FIG. 5E, the points mark the detected second information (I).

The inverse perspective mapping algorithm mentioned above may also be performed on a segmented Image region of a captured image. That is, as mentioned above, the controller 180 may perform the inverse perspective mapping algorithm on the plurality of matched image regions among the plurality of image regions included in the first and second images. That is, the controller 180 may perform the inverse perspective mapping algorithm on one of the plurality of image regions included in the first image and the image region which is matched to the one image region included in the first image and which is included in the second image to detect information related to an obstacle.

In another embodiment, the controller 180 may extract at least one feature point with respect to the first and second images. In addition, the controller 180 may detect third information related to the obstacle on the basis of the extracted feature point.

In detail, the controller 180 may estimate information related to an optical flow of the first and second images which are continuously captured. On the basis of the estimated optical flow, the controller 180 may extract information related to homography regarding the floor on which the mobile robot 100 is traveling. Accordingly, the controller 180 may detect the third information related to the obstacle by using the information related to the homography. For example, the controller 180 may detect the third information related to the obstacle by calculating an error value of the homography corresponding to extracted feature points.

In another example, the controller 180 may extract a feature point on the basis of a corner or a segment included in the first and second images.

Figure 5F:
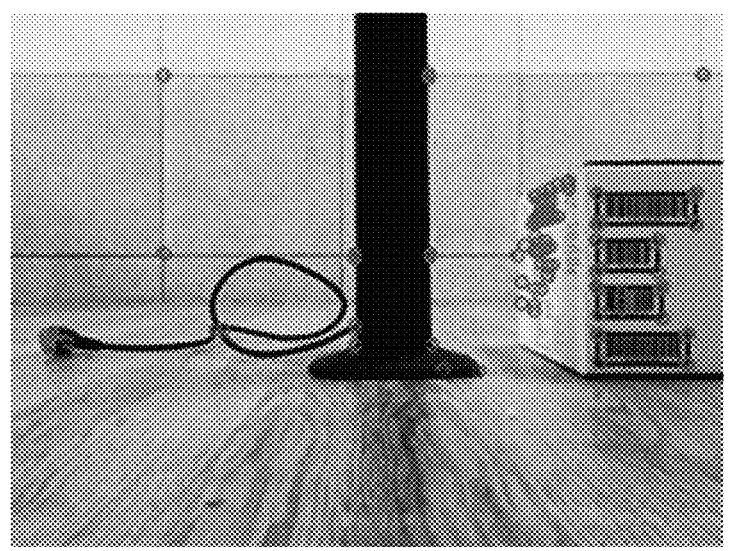

FIG. 5F illustrates an embodiment in which a feature point extraction is performed on the first image. The red points illustrated in FIG. 5F indicate the detected third information.

Meanwhile, the controller 180 may set information related to a weight value with respect to each of the first to third information. In addition, the controller 180 may detect fourth information related to the obstacle on the basis of the set weight values and the first to third information.

In detail, the controller 180 may set information related to the weight values respectively corresponding to the first to third information by using a graph-cut algorithm. Also, the controller 180 may set information related to the weight values on the basis of a user input. Accordingly, the controller 180 may finally detect fourth information related to the obstacle by combining the obstacle detection methods described above.

Also, the controller 180 may generate map information related to the obstacle by using the first to fourth information.

Figure 6:
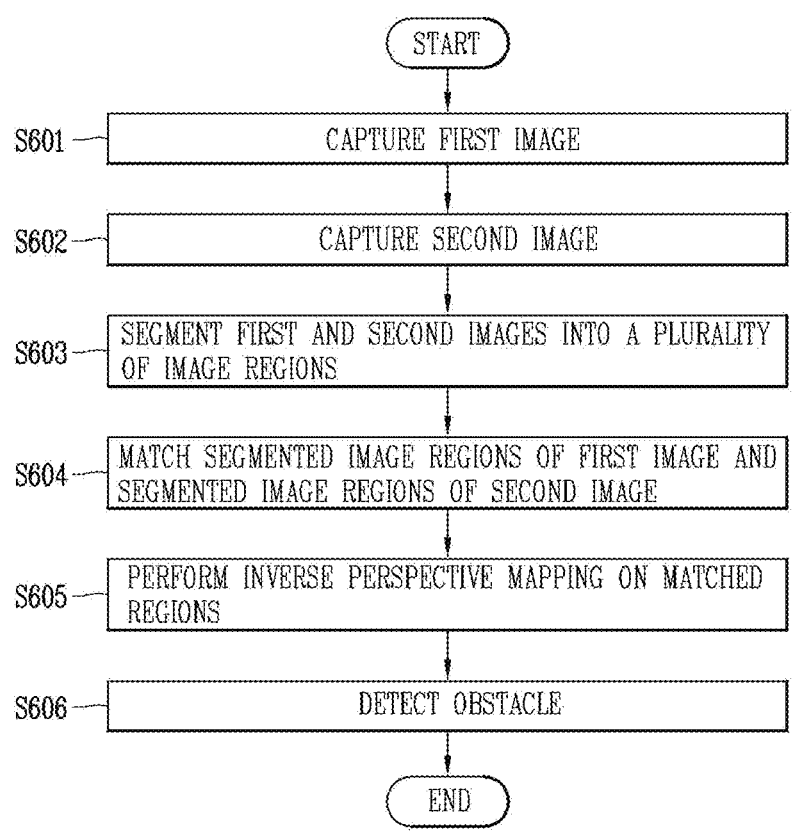
FIG. 6 is a flow chart illustrating a method for controlling a mobile robot according to another embodiment of the present disclosure.

Hereinafter, another embodiment related to a control method of a mobile robot of the present disclosure will be described with reference to FIG. 6.

The camera sensor 144 may capture a first image (S601), and capture a second image after the first image is captured (S602).

The controller 180 may segments each of the first and second images into a plurality of regions (S603).

The controller 180 may match the segmented image regions of the second image and the segmented images of the first image (S604).

The controller 180 may inverse-perspective-map any one of the matched regions to the other region (S605).

The controller 180 may detect an obstacle on the basis of the result of the inverse perspective mapping (S606).

According to embodiments of the present disclosure, since an obstacle may be detected only through a single camera, manufacturing cost of the mobile robot may be reduced.

In addition, the mobile robot according to the present disclosure may have enhanced performance in detecting an obstacle by using a monocular camera.

Also, the mobile robot according to the present disclosure may accurately detect an obstacle, regardless of an installation state of the camera.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

The invention claimed is:

1. A cleaner comprising:
   a main body having a suction opening;
   a cleaning unit provided within the main body and that sucks a cleaning target through the suction opening;
   a driving unit that moves the main body;
   a camera sensor that is attached to the main body and captures a first image;
   an operation sensor that senses information related to movement of the main body; and
   a controller that detects information related to an obstacle on a basis of at least one of the captured the image or the information related to movement, and controls the driving unit on a basis of the detected information related to the obstacle,
   wherein the controller segments the captured first image into a plurality of image regions, and detects first information related to the obstacle from the segmented image regions of the first image, and
   wherein when a preset time interval has lapsed since the first image was captured:
      the camera sensor captures a second image, and
      the controller converts the first image, projects the converted image to the second image to generate a third image, and compares the generated third image with the second image to detect second information related to the obstacle.

2. The cleaner of claim 1, wherein the controller segments the second image into a plurality of image regions, compares the segmented image regions of the first image with the segmented image regions of the second image, and detects the first information related to the obstacle on a basis of comparing the segmented image regions of the first image and the segmented image regions of the second image.

3. The cleaner of claim 2, wherein the controller matches at least one of the segmented image regions of the second image and at least one of the segmented image regions of the first image that correspond to each other.

4. The cleaner of claim 1, wherein the controller detects the second information related to the obstacle on a basis of a difference in color between the generated third image and the second image.

5. The cleaner of claim 1, wherein the controller extracts at least one feature point from the first image, and detects third information related to the obstacle on a basis of the extracted feature point.

6. The cleaner of claim 5, wherein the controller sets information related to respective weight values for the first information, the second information, and the third information, and detects fourth information related to the obstacle on a basis of the set weight value, the first information, the second information, and the third information.

7. The cleaner of claim 5, wherein the controller generates map information related to the obstacle using the first information, the second information, and the third information.

8. The cleaner of claim 1, wherein an image capture angle of the camera sensor is an omnidiectional range with respect to the main body.

9. The cleaner of claim 1, wherein the operation sensor includes at least one of a gyro sensor, an acceleration sensor, or a wheel sensor.

10. The cleaner of claim 1, wherein the camera sensor captures the first image in a movement direction of the main body.

11. A device comprising:
    a main body;
    a motor that moves the main body;
    a camera sensor that is attached to the main body and captures a first image;
    an operation sensor that senses information related to movement of the main body; and
    a controller that detects information related to an obstacle on a basis of at least one of the captured first image and the information related to movement, and controls the motor on a basis of the detected information related to the obstacle,
    wherein the controller segments the captured first image into a plurality of image regions, and detects first information related to the obstacle from the segmented image regions of the first image, and
    wherein after a preset time interval has lapsed since the first image was captured:
       the camera sensor captures a second image, and
       the controller converts the first image, projects the converted image to the second image to generate a third image, and compares the generated third image with the second image to detect second information related to the obstacle.

12. The device of claim 11, wherein the controller segments the second image into a plurality of image regions, compares the segmented image regions of the first image with the segmented image regions of the second image, and detects the first information related to the obstacle on a basis of comparing the segmented image regions of the first image with the segmented image regions of the second image.

13. The device of claim 12, wherein the controller matches at least one of the segmented image regions of the second image and at least one of the segmented image regions of the first image that correspond to each other.

14. The device of claim 11, wherein the controller detects the second information related to the obstacle on a basis of a difference in color between the generated third image and the second image.

15. The device of claim 11, wherein the controller extracts at least one feature point from the first image, and detects third information related to the obstacle on a basis of the extracted feature point.

16. The device of claim 15, wherein the controller sets information related to respective weight values for the first information, the second information, and the third information, and detects fourth information related to the obstacle on a basis of the set weight values, the first information, the second information, and the third information.

17. The device of claim 15, wherein the controller generates map information related to the obstacle using the first information, the second information, and the third information.

18. The device of claim 11, wherein an image capture angle of the camera sensor is an omnidiectional range with respect to the main body.

19. The device of claim 11, wherein the operation sensor includes at least one of a gyro sensor, an acceleration sensor, or a wheel sensor.

20. The device of claim 11, wherein the camera sensor captures the first image in a movement direction of the main body.

* * * * *